(12) United States Patent
Carpenter et al.

(10) Patent No.: US 10,922,762 B2
(45) Date of Patent: Feb. 16, 2021

(54) SYSTEM AND METHOD FOR PRODUCING A CUSTOMIZED BEVERAGE OR BEVERAGE CONCENTRATE

(71) Applicant: THE COCA-COLA COMPANY, Atlanta, GA (US)

(72) Inventors: Gregg Carpenter, Marietta, GA (US); Chih-Shang Fu, Milpitas, CA (US); Xiaoyan Huang, Marietta, GA (US); Guy Wollaert, Ghent (BE); Nancy Quan, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 120 days.

(21) Appl. No.: 15/564,239

(22) PCT Filed: Apr. 11, 2016

(86) PCT No.: PCT/US2016/026955
§ 371 (c)(1),
(2) Date: Oct. 4, 2017

(87) PCT Pub. No.: WO2016/168120
PCT Pub. Date: Oct. 20, 2016

(65) Prior Publication Data
US 2018/0130141 A1 May 10, 2018

Related U.S. Application Data

(60) Provisional application No. 62/146,476, filed on Apr. 13, 2015.

(51) Int. Cl.
*G06Q 30/06* (2012.01)
*G06Q 50/04* (2012.01)
(Continued)

(52) U.S. Cl.
CPC ......... *G06Q 50/04* (2013.01); *G06Q 30/0201* (2013.01); *G06Q 30/06* (2013.01);
(Continued)

(58) Field of Classification Search
CPC .... A23V 2002/00; A23V 2200/30–334; G07F 7/00; G07F 7/08; G07F 13/065;
(Continued)

(56) References Cited

U.S. PATENT DOCUMENTS

2002/0004749 A1   1/2002  Froseth et al.
2002/0161664 A1*  10/2002 Shaya ................... G06Q 30/02
                                                                705/7.31
(Continued)

OTHER PUBLICATIONS

Mining Customer Behavior Knowledge to Develop Analytical Expert System for Beverage Marketing. Chun Fu Lin, Yu Hsin Hung, and Ray I Chang. International Journal of Computer Trends and Technology (IJCTT)—vol. 4, Issue 4. Apr. 2013 (Year: 2013).*

*Primary Examiner* — William J Allen
(74) *Attorney, Agent, or Firm* — Eversheds Sutherland (US) LLP

(57) ABSTRACT

A system for producing a customized beverage or beverage concentrate is disclosed. The system comprises a personalization server and a distribution machine communicatively coupled to the personalization server. The personalization server is configured to receive need and want information associated with a consumer, analyze the need and want information, apply a plurality of rules to the analyzed need and want information, and produce one or more customized beverage or beverage concentrate recipes based on the analysis of the need and want information and the application of the plurality of rules. The distribution machine is configured to receive the one or more customized beverage or beverage concentrate recipes from the personalization server and produce and deliver at least one customized (Continued)

beverage or beverage concentrate based on the one or more customized beverage or beverage concentrate recipes to the consumer by combining one or more beverage ingredients.

18 Claims, 7 Drawing Sheets

(51) Int. Cl.
  *G06Q 30/02* (2012.01)
  *A47J 31/40* (2006.01)
  *G06F 3/0488* (2013.01)
(52) U.S. Cl.
  CPC ........... *G06Q 30/0621* (2013.01); *A47J 31/40* (2013.01); *G06F 3/0488* (2013.01)
(58) Field of Classification Search
  CPC ........ G06Q 50/00; G06Q 50/04; G06Q 50/12; G06Q 30/0201; G06Q 30/06; G06Q 30/0601–0643; G06Q 30/08; G06Q 20/18; A47J 31/40; G06F 3/0488
  See application file for complete search history.

(56) References Cited

U.S. PATENT DOCUMENTS

| | | | |
|---|---|---|---|
| 2006/0081653 A1 | 4/2006 | Boland et al. | |
| 2006/0271394 A1 | 11/2006 | Kelly | |
| 2011/0289044 A1 | 11/2011 | Harrison | |
| 2012/0285986 A1* | 11/2012 | Irvin | B67D 1/0041 |
| | | | 222/1 |
| 2013/0339163 A1* | 12/2013 | Dumontet | G06Q 30/0631 |
| | | | 705/15 |
| 2014/0072679 A1 | 3/2014 | Balassanian | |
| 2014/0101233 A1* | 4/2014 | Mina | H04L 29/06047 |
| | | | 709/203 |
| 2014/0324624 A1* | 10/2014 | Ward | H04W 4/021 |
| | | | 705/26.7 |
| 2015/0363860 A1* | 12/2015 | Lantrip | G06Q 30/0631 |
| | | | 705/5 |
| 2016/0201347 A1* | 7/2016 | Lala | E04H 3/04 |
| | | | 705/15 |
| 2017/0172340 A1* | 6/2017 | Baarman | A47J 31/52 |
| 2017/0251263 A1* | 8/2017 | Jaini | H04N 21/4756 |
| 2017/0344950 A1* | 11/2017 | Dhagumudi | G06Q 10/101 |

* cited by examiner

SYSTEM AND METHOD FOR PRODUCING A CUSTOMIZED BEVERAGE OR BEVERAGE CONCENTRATE

BACKGROUND

The beverage industry is thriving thanks in large part to consumers. Consumers have started to show increased interest in products that are personalized or tailored to them.

SUMMARY

In an embodiment, a system for producing a customized beverage or beverage concentrate is disclosed. The system comprises a personalization server that comprises at least one processor. The personalization server is configured to receive need information associated with a consumer. The need information comprises information about what the consumer needs in a beverage to improve the consumer's health or diet. The personalization server is also configured to receive want information associated with the consumer. The want information comprises information about what the consumer desires or prefers in a beverage in terms of sense or experience. The personalization server is additionally configured to analyze the need information and the want information and apply a plurality of rules to the analyzed need information and the want information. The plurality of rules comprises at least two of a regulatory rule, a stability rule, and a taste rule. The personalization server is further configured to produce one or more customized beverage or beverage concentrate recipes based on the analysis of the need information and the want information and the application of the plurality of rules. The system also comprises a distribution machine communicatively coupled to the personalization server that comprises at least one processor and a generation element. The distribution machine is configured to receive the one or more customized beverage or beverage concentrate recipes from the personalization server and produce and deliver at least one customized beverage or beverage concentrate based on the one or more customized beverage or beverage concentrate recipes via the generation element to the consumer by combining one or more beverage ingredients.

In an embodiment, a system for producing a customized beverage or beverage concentrate is disclosed. The system comprises a rules database that stores regulatory rules, taste rules, and stability rules, a consumer profile database that stores a plurality of consumer profiles associated with a plurality of consumers, a historical database that stores historical information for a plurality of recipes, a sales database that stores sales information associated with the plurality of recipes from a plurality of point-of-sale terminals, and a personalization server comprising at least one processor that is communicatively coupled to the rules database, the consumer profile database, the sales database, the historical database, and the analysis engine. The analysis engine is stored in at least one memory, and when executed by at least one processor provides one or more customized beverage or beverage concentrate recipes, based on need information and want information associated with a consumer and on the historical information from the historical database, for delivery to a distribution machine. The analysis engine comprises an inference engine stored in at least one memory, that when executed by at least one processor, processes the need information and the want information associated with the consumer into profile elements. The profile elements are stored in a corresponding consumer profile of the plurality of consumer profiles in the consumer profile database. The need information comprises information about what the consumer needs in a beverage to improve the consumer's health or diet and the want information comprises information about what the consumer desires or prefers in a beverage in terms of sense or experience. The analysis engine further comprises a predictive engine stored in at least one memory, that when executed by at least one processor, produces one or more favorable customized beverage or beverage concentrate recipes through analysis based on the profile elements and on the historical information from the historical database and a rules engine stored in at least one memory, that when executed by at least one processor, produces one or more acceptable customized beverage or beverage concentrate recipes through analysis based on application of the plurality of rules from the rules database. The one or more customized beverage or beverage concentrate recipes for delivery to the distribution machine are selected based on a combination of the analysis of the predictive engine and the analysis of the rules engine.

In an embodiment, a method for producing a customized beverage or beverage concentrate is disclosed. The method comprises receiving, by a personalization server that comprises at least one processor, need information associated with a consumer. The need information comprises information about what the consumer needs in a beverage to improve the consumer's health or diet and includes one or more of gender, age, ethnicity, nutritional status, health status, bone health, hydration level, vitamin or mineral measurement, temperature, time of day, mental status, lifestyle, DNA, microbiome, environment, allergies, vitamins, minerals, or probiotics. The method also comprises receiving, by the personalization server, want information associated with the consumer. The want information comprises information about what the consumer desires or prefers in a beverage in terms of sense or experience and includes one or more of a flavor parameter, a texture parameter, a sweetness parameter, or a carbonation parameter. The method additionally comprises analyzing, by the personalization server, the need information and the want information and applying, by the personalization server, a plurality of rules to the analyzed need and want information. The plurality of rules comprises a regulatory rule, a stability rule, and a taste rule. The method further comprises producing, by the personalization server, one or more customized beverage or beverage concentrate recipes based on the analysis of the need information and the want information and the application of the plurality of rules, providing, by the personalization server to a distribution machine communicatively coupled to the personalization server, the one or more customized beverage or beverage concentrate recipes for the consumer, and producing, by the distribution machine, at least one customized beverage or beverage concentrate for the consumer based on the one or more customized beverage or beverage concentrate recipes.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
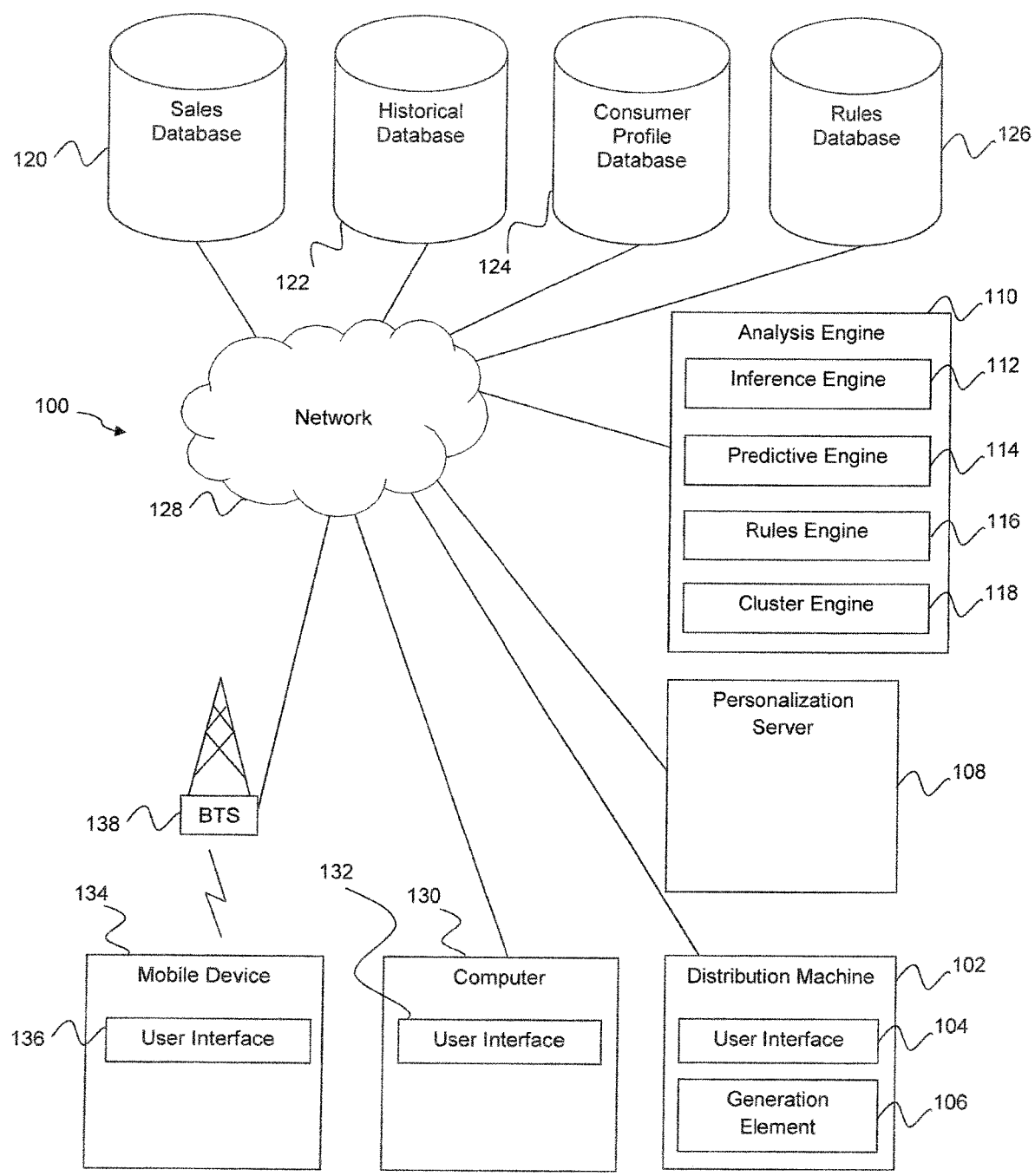
FIG. 1 is a block diagram of a system for producing a customized beverage or beverage concentrate according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The pending application is directed to a system and method for producing a customized beverage or beverage concentrate for a consumer. In particular, the pending application is directed to a personalized/customized drink intelligence system and method that combines a consumer's needs with a consumer's wants and utilizes a plurality of rules related to regulations, chemistry, safety, stability, and taste to produce a favorable and acceptable beverage or beverage concentrate for the consumer that meets the consumer's needs and wants.

A consumer's need information and want information may be input by the consumer. Additionally or alternatively, a consumer's need information and want information may be deduced or inferred based on having the consumer answer general and/or specific lifestyle, health, and preference questions and/or may have more explicit support comprising specific/direct input from the consumer. The consumer's need information and want information may also be inferred or deduced by direct or indirect feedback obtained from the consumers. Direct consumer feedback may include the consumer indicating a preference for a particular type of drink, the consumer being provided with a plurality of personalized/customized beverage options via a user interface at a distribution machine and selecting one of the options, and/or the consumer indicating whether or not they liked their created personalized/customized drink and why they do/do not like it after tasting the drink. Indirect consumer feedback on the other hand may include tracking personalized/customized beverage or beverage concentrate purchases such as through the use of the consumer's personal profile.

The need information and want information collected from the consumer can be stored in a personal profile for the consumer and maintained in a consumer profile database. A consumer's need information may include things such as lifestyle, DNA, microbiome, environment, age, ethnicity, allergies, vitamins, minerals, probiotics, or other needs while a consumer's want information may include things such as texture, flavor spectrum, sweetness, sweetener choice, carbonation spectrum, or other desires. The tangible output delivered by the distribution machine to the consumer may be a beverage in liquid form or a concentrate (e.g., a powder or a liquid) that can be combined possibly at a later time with a liquid to make a beverage.

The distribution machine may use one or more powders possibly combined with one more liquids to produce and deliver the customized beverage or beverage concentrate to the consumer. The powders may be stored in predefined/pre-sealed containers on a spool in the distribution machine to help keep the powders dry and to help accurately meter ingredients to ensure accurate dosages. The distribution machine may initially identify the consumer (e.g., by an identification of the consumer, by an application on the consumer's mobile device, etc.) and be in communication with one or databases to provide a protection mechanism for the consumer such that the consumer is not over-served or over-delivered ingredients and/or under-served or under-delivered ingredients.

In an embodiment, in order to avoid the need for mixing and/or heating, the powders in the distribution machine are highly soluble. Further, to avoid cross-contamination, a dispensing element of the distribution machine may be rinsed and/or sanitized between operations and/or the ingredients may be dispensed directly into the vessel being provided to the consumer.

Now turning to FIG. 1, a system 100 for producing a customized beverage or beverage concentrate is disclosed. In an embodiment, the system 100 comprises a distribution machine 102, a personalization server 108, an analysis engine 110, a plurality of databases 120-126, and a network 128. The system 100 may also comprise a computer 130 and/or a mobile device 134.

In an embodiment, a consumer may input some or all of their want information and need information to the distribution machine 102 via the user interface 104 such as when the consumer approaches the distribution machine 102 for a customized beverage or beverage concentrate. Alternatively or additionally, a consumer may input some or all of their want information and need information using a computer 130 via user interface 132 or a mobile device 134 via user interface 136 prior to approaching the distribution machine 102 for a customized beverage or beverage concentrate. Mobile devices and computers are discussed in more detail hereinafter with reference to FIGS. 4-7.

In some embodiments, a consumer's want information and need information is alternatively or additionally deduced or inferred based on having the consumer answer general and/or specific lifestyle, health, and preference questions and/or may have more explicit support comprising specific/direct input from the consumer (e.g., I have this allergy, doctor says I need more calcium, I like this ingredient, I want this range of carbonation, etc.). The data, particularly the want information that the consumer desires, may also be deduced by feedback obtained from the consumers on impressions and preferences of known existing drinks (I like this drink better than that drink, I like this flavor of that drink, this drink is too sparkly, that drink is too sweet, etc.).

A consumer's need information may include things such as lifestyle, DNA, microbiome, environment, age, ethnicity, allergies, vitamins, minerals, probiotics, or other needs while a consumer's want information may include things such as texture, flavor spectrum, sweetness, sweetener choice, carbonation spectrum, or other desires. In an embodiment, the consumer's want information and need information is stored in a consumer or personal profile in a database and may be accessed by recognizing the consumer at the distribution machine 102.

In an embodiment, the distribution machine 102 is communicatively coupled to the personalization server 108 via the network 128. The personalization server 108 may be a computer discussed in further detail hereinafter with reference to FIG. 7. The network 128 may comprise one or more private networks, one or more public networks, or a combination thereof. The network 128 promotes communication as desired among the several components of FIG. 1.

Upon a consumer approaching and/or arriving at the distribution machine 102, the consumer may be uniquely identified. For example, the distribution machine 102 may comprise a reader (e.g., camera, RFID reader, NFC reader, etc.) and the consumer may have a mobile device, such the mobile device 134, with an application that provides a unique consumer identifier to the reader of the distribution machine 102. The distribution machine 102 may provide the unique consumer identifier to a backend server, such as the personalization server 108, which may receive the consumer's personal profile, such as from the consumer profile database 124, based on the unique consumer identifier. In some embodiments, the consumer's personal profile is provided from the personalization server 108 to the distribution machine 102.

Alternatively, the consumer may be uniquely identified by having an application on the consumer's mobile device, such as mobile device 134, read an equipment identifier (e.g., displayed QR code, RFID tag, sticker, etc.) associated with the distribution machine 102 and communicate the equipment identifier to a backend server, such as the personalization server 108, via the base transceiver station 138 and the network 128. The mobile device 134 via a cellular radio transceiver (not shown) is configured to establish a radio communication link with the base transceiver station 138 based on one or more of a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another cellular wireless communication protocol. The base transceiver station 138 provides connectivity to the network 128 to the mobile device 134. Based on the received equipment identifier, the personalization server 108 may provide the consumer's profile, such as from the consumer profile database 124, to the distribution machine 102 corresponding to the received equipment identifier. In an embodiment, the personalization server 108 instead provides the consumer's profile to the consumer's mobile device 134 and the mobile device 134 provides the consumer's profile to the distribution machine 102 via local communication (e.g., NFC, Bluetooth, WiFi, etc.).

Upon a consumer approaching and/or arriving at the distribution machine 102, the personalization server 108 may receive need information associated with the consumer and want information associated with the consumer. In an embodiment, the need information comprises information about what the consumer needs in a beverage to maintain or improve the consumer's health or diet and the want information comprise information about what the consumer desires or prefers in a beverage in terms of sense or experience. The sense or experience may comprise one or more of taste, sight, smell, touch, or sound. As discussed above, the need information and the want information may be stored in and received from a profile, input by the consumer via one or more of the user interface 104 of the distribution machine 102, the user interface 132 of the computer 130, or the user interface 136 of the mobile device 134, and/or inferred or deduced based on the consumer's answers to general or specific questions (e.g., are you male or female?, what is your age?, what is your ethnicity?, which of these drinks do you like the best?, etc.), the consumer's direct input (e.g., I have this allergy, doctor says I need more calcium, I like or do not like this ingredient, I want this range of carbonation, I liked or did not like this personalized beverage or beverage concentrate, etc.), and/or the consumer's behavior (e.g., past purchases, exercise routines, etc.). The profile may be a personal profile associated with the consumer (i.e., a consumer profile) or a cluster profile associated with a category of consumer that includes the consumer.

In an embodiment, the personalization server 108 analyzes the need information and the want information and applies a plurality of rules to the analyzed need information and the want information. The plurality of rules may comprise one or more of a regulatory rule, a stability rule, a safety rule, a taste rule, or another rule. In an embodiment, a regulatory rule comprises an FDA restriction (e.g., cannot have more than x % aspartame, etc.). A stability rule may comprise knowledge related to what ingredients are stable when combined (e.g., these ingredients are stable when combined while these ingredients are not stable when combined and therefore should not be combined, etc.). In an embodiment, a safety rule comprises knowledge related to what ingredients are safe to be combined (e.g., these ingredients cannot be combined because it is not as safe (e.g., too flammable, etc). A taste rule may comprise knowledge related to what ingredients taste favorable together (e.g., these ingredients taste favorable together while these ingredients do not, etc.). The personalization server 108 may produce one or more customized beverage or beverage concentrate recipes based on the analysis of the need information and the want information and the application of the one or more rules.

In some embodiments, the personalization server 108 works with the analysis engine 110 to produce the one or more customized beverage or beverage concentrate recipes. The analysis engine 110 may be a computer described in more detail below with respect to FIG. 7. Although illustrated as separate components, one of ordinarily skill in the art will recognize that the personalization server 108 could comprise the analysis engine 110 without departing from the spirit and scope of the present disclosure. The analysis engine may comprise a plurality of engines. For example, the analysis engine 110 may comprise an inference engine 112, a predictive engine 114, a rules engine 116, and a cluster engine 118. Although illustrated as separate components, one of ordinary skill in the art will recognize that the one or more of the engines 112-118 could be combined without departing from the spirit and scope of the present disclosure.

The analysis engine 110 may be communicatively coupled via the network 128 to a plurality of databases. The plurality of databases may comprise a sales database 120, a historical database 122, a consumer profile database 124, and a rules database 126. Although illustrated as separate databases, one of ordinary skill in the art will recognize that the one or more of the databases 120-126 could be combined without departing from the spirit and scope of the present disclosure. In an embodiment, the sales database 120 is tied to point-of-distribution/point-of-sale systems (e.g., the distribution machine 102) and other existing sales monitoring and tracking systems and stores raw sales information associated with the customized beverage or beverage concentrates produced. The raw sales information stored in the sales database 120 may be extracted and processed for storage in the historical database 122. For example, the personalization server 108 and/or the inference engine 112 may process the raw sales data for storage in the historical database 122.

In an embodiment, the historical database 122 is keyed to recipes and stores historical information such as which consumers or consumer clusters bought which recipes and how often, consumer feedback for each recipe, how much of a recipe is purchased, locations where recipes were selected/purchased, repeat purchases by a given consumer including time and volume, and/or other information related to each recipe. The historical information stored in the historical database 122 may include some form of consumer identification to provide links to consumers (and the consumer profile database 124) in a secure manner preserving privacy of the ultimate consumer. In some embodiments, at least some of the historical information stored in the historical database 122 may not be tied to a consumer or a consumer cluster and may instead be tied just to recipes, specifically tracking whether a recipe is a first time purchase or a repeat purchase and/or how many purchases for each recipe.

The consumer profile database 124 may store consumer or personal profiles keyed to consumer identifications. In an embodiment, the consumer profile database 124 additionally stores cluster profiles. The profiles stored in the consumer profile database 124 may be updated based on the historical data from the historical database 122 and consumer feedback including consumer activity (e.g., selections, sales, etc.). For example, each consumer profile may be updated to reflect recipes purchased, how often each recipe is purchased, when/where each recipe is purchased, or other information.

In an embodiment, the rules database 126 stores regulatory, taste, stability, and safety information in the form of rules and algorithms used by the personalization server 108 and/or the analysis engine 110. For example, the rules database 126 may store the plurality of rules (e.g., one or more of a regulatory rule, a stability rule, a safety rule, a taste rule, or another rule) discussed above. In an embodiment, each database 120-126 will have links to each other and may be updated based on inputs to each other.

As discussed above, the personalization server 108 may work with the various engines 112-118 of the analysis engine 110 to produce the one or more customized beverage or beverage concentrate recipes. In an embodiment, the inference engine 112 processes need information and want information into profile elements, which are stored in a corresponding consumer profile in the consumer profile database 124. The predictive engine 114 may match profile elements to ingredients and work in conjunction with the rules engine 116 as well as the historical database 122, and possibly the cluster engine 118, to produce favorable ingredient combinations/beverage or beverage concentrate recipes. The rules engine 116 may work in conjunction with the predictive engine 114 to identify acceptable ingredient combinations/beverage or beverage concentrate recipes in terms of the taste, stability, and safety rules stored in the rules database 126.

In an embodiment, the predicative engine 114 produces a set of one or more favorable customized beverage or beverage concentrate recipes through analysis based on the profile elements of the consumer's profile in the consumer profile database 124 and on historical information from the historical database 122. The rules engine 116 may then produce one or more acceptable customized beverage or beverage concentrate recipes through analysis based on the application of the plurality of rules from the rules database 126 to the set of one or more favorable customized beverage or beverage concentrate recipes produced by the predictive engine 114. Alternatively, the rules engine 116 may produce a set of one or more acceptable customized beverage or beverage concentrate recipes through analysis based on the application of the plurality of rules from the rules database 126. The predictive engine 114 may then produce one or more favorable customized beverage or beverage concentrate recipes through analysis of the set of the one or more acceptable beverage or beverage concentrate recipes produced by the rules engine 116 based on the profile elements of the consumer's profile in the consumer profile database 124 and on historical information from the historical database 122. In yet another embodiment, the predictive engine 114 and the rules engine 116 work together to produce a set of one or more acceptable and favorable customized beverage or beverage concentrate recipes through analysis based on the profile elements of the consumer's profile in the consumer profile database 124, on historical information in the historical database 122, and on the application of the plurality of rules from the rules database 126.

The cluster engine 118 may analyze the individual consumer profiles in the consumer profile database 124, the sales information in the sales database 120, and the historical information in the historical database 122 to identify clusters of consumers (i.e., categories of consumers with similarities). In an embodiment, the cluster engine 118 may create cluster profiles for each category of consumer and store the cluster profiles in the consumer profile database 124 or another database.

In formulating the customized beverage or beverage concentrate recipes, the personalization server 108 and/or analysis engine 110 may start with baseline beverage types (e.g., cola, juice, milk, coffee, sports drink, energy drink, tea, still water, carbonated water, etc.) that have baseline formulations, tweak those baselines based on a consumer's want information and need information and balance as needed based on the plurality of rules stored in the rules database 126. Alternatively, in some embodiments, the personalization server 108 and/or the analysis engine 110 formulates each customized beverage or beverage concentrate recipe from scratch for the consumer.

The distribution machine 102 may receive one or more favorable and acceptable customized beverage or beverage concentrate recipes from the personalization server 108 and produce and deliver at least one customized beverage or beverage concentrate based on the one or more customized beverage or beverage concentrate recipes via a generation element 106. In an embodiment, in order to determine which customized beverage or beverage concentrate recipe to produce and deliver to the consumer, the distribution machine 102 displays one or more abstracts corresponding to the one or more customized beverage or beverage concentrate recipes to the consumer via the user interface 104. For example, the one or more abstracts provided to the user may comprise at least one of beverage type, key ingredient(s), still or sparkling, or other information about the particular beverage to aid the consumer in determine which beverage or beverage concentrate they would prefer. After displaying the one or more abstracts, the distribution machine 102 may receive a selection of one of the one or more abstracts corresponding to the one or more customized beverage or beverage concentrate recipes from the consumer via the user interface 104. In such an embodiment, the distribution machine 102 produces and delivers a customized beverage or beverage concentrate corresponding to the selected abstract to the consumer via the generation element 106.

The customized beverage or beverage concentrate may be delivered by the distribution machine 102 as a single serving or multiple servings. Additionally, if the distribution machine 102 produces a customized beverage, the customized beverage may be delivered in a liquid form and may be hot, cold, or room temperature depending on the consumer's want information and/or need information. If the distribution machine 102 produces a customized beverage concentrate, the customized beverage concentrate may be delivered in a liquid form (e.g., a syrup, etc.) or a powder form to be combined possibly at a later time with a liquid to make a beverage. In additional to delivering the customized beverage or beverage concentrate to the consumer, the distribution machine 102 may also deliver (e.g., via the user interface 104 or a print out) a list of ingredients and a nutritional breakdown of the customized beverage or beverage concentrate to comply with FDA requirements.

After the customized beverage or beverage concentrate is delivered to the consumer, direct and/or indirect feedback from the consumer may be received by the personalization server 108 to improve personalized/customized drink delivery for the particular consumer as well as other consumers. For example, the consumer could provide feedback regarding the delivered customized beverage or beverage concentrate via user interface 104 of the distribution machine 102, user interface 132 of the computer 130, and/or user interface 136 of the mobile device 134. In an embodiment, the direct consumer feedback includes the consumer indicating whether or not they liked their customized beverage or beverage concentrate after tasting the drink and why they did or did not like it (e.g., too sweet, too much carbonation, etc.). Direct consumer feedback may also include providing the consumer with a plurality of abstracts corresponding to a plurality of customized beverage or beverage concentrate recipes via user interface 104 of the distribution machine 102 and letting the consumer select which customized beverage or beverage concentrate they want distributed to them via the distribution machine 102. In an embodiment, the corresponding consumer profile in the consumer profile database 124 and the historical information in the historical database 122 are updated based on the direct consumer feedback.

Indirect consumer feedback may comprise tracking the consumer's purchases of a customized beverage or beverage concentrate that was delivered to the consumer via the distribution machine 102 and/or another distribution machine or point-of-sale device. For example, the system 100 may track how many times a consumer purchased each customized beverage or beverage concentrate. In some embodiments, the distribution machine 102 is also a point-of-sale device. The consumer's purchases may be tracked based on an identification provided by the consumer during the purchases. As discussed above, such sales information may be received from point-of-distribution/point-of-sale systems (e.g., the distribution machine 102) and other existing sales monitoring and tracking systems and stored in the sales database 120. In an embodiment, the corresponding consumer profile in the consumer profile database 124 and the historical information in the historical database 122 are updated based on the indirect consumer feedback, such as by the personalization server 108 and/or the analysis engine 110 via the inference engine 112 processing the raw sales information in the sales database 120.

The direct and/or indirect consumer feedback may be used to improve specific choices for the particular consumer by adding more data to the decision analysis for that consumer. Additionally, the direct and/or indirect consumer feedback may be used to improve the decision matrix for all consumers (e.g., consumers with these profiles and these know previously liked or disliked drinks favored this proposed result at a higher rate either with improved explicit feedback scores or with continuing purchases over time of the customized beverage or beverage concentrate). In an embodiment, the direct and/or indirect consumer feedback, customized beverages or beverage concentrates produced and delivered to consumers, and personal information gathered via consumer profiles may be analyzed by the personalization server 108 and/or the analysis engine 110 to produce the next mass market drink directed to a particular group or niche market.

Figure 2:
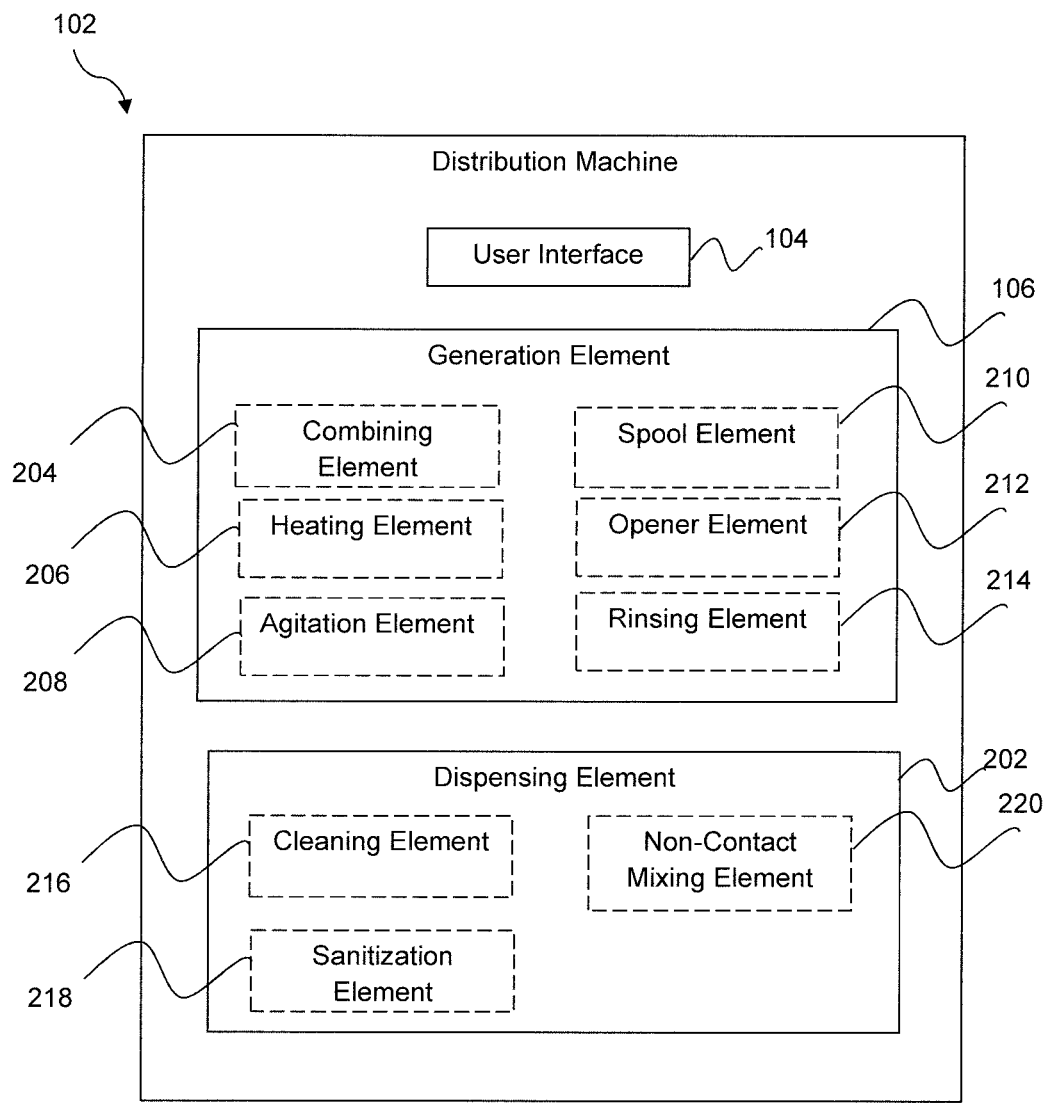
FIG. 2 is a block diagram of a distribution machine that produces a customized beverage or beverage concentrate according to an embodiment of the disclosure.

Now turning to FIG. 2, an embodiment of the distribution machine 102 is disclosed. The distribution machine 102 comprises the user interface 104, the generation element 106, and a dispensing element 202. The generation element 106 may comprise one or more of a combining element 204, a heating element 206, an agitation element 208, a spool element 210, an opener element 212, or a rinsing element 214. The dispensing element 202 may comprise one or more of a cleaning element 216, a sanitation element 218, or a non-contact mixing element 220.

In order to produce and deliver the customized beverages or beverage concentrates to consumers based on both need information and want information, the distribution machine 102 may combine via the combining element 204 one or more liquids (e.g., syrups, water, carbonated water, etc.) with one or more powders. Alternatively, in order to produce and deliver the customized beverages or beverage concentrates to consumers based on both need information and want information, the distribution machine 102 may combine via the combining element 204 just liquids (e.g., syrups, water, carbonated water, etc.).

When attempting to satisfy both a consumer's needs (e.g., vitamins, etc.) and wants (e.g., caffeine, etc.), the distribution machine 102 may initially identify the consumer as discussed above (e.g., by an identification of the consumer, by an application on the consumer's mobile device 134, etc.) and be in communication with one or more of the plurality of databases 120-126 to provide a protection mechanism for the consumer such that the consumer is not over-served or over-delivered ingredients and/or under-served or under-delivered ingredients. For example, the distribution machine 102 may communicate with the historical database 122 and/or the consumer profile database 124 and identify that the consumer has already been provided with a plurality of the customized beverage or beverage concentrates today. In an embodiment, in response to such identification, the distribution machine 102 does not deliver any more of the beverage or beverage concentrate already provided to the consumer and/or reduces or eliminates one or more ingredients when providing any more beverage or beverage concentrates to that consumer. Such a protection mechanism helps to reduce the risk to consumers.

In an embodiment, one or more of the powders used by the distribution machine 102 in producing the customized beverage or beverage concentrate are highly soluble such that that they dissolve without having to worry about time, mixing, and/or adding heat. In some embodiments, one or more of the powders used by the distribution machine 102 in producing the customized beverage or beverage concentrate are less soluble such that they need to be combined with hot water (such as by using the heating element 206) and/or agitated (such as by using the agitation element 208) to dissolve.

The powders used by the distribution machine 102 may be stored in predefined/pre-sealed containers on a spool in spool element 210. Storing the powders in predefined/pre-sealed containers may help keep powders dry and may also help accurately meter ingredients to ensure accurate dosages. In an embodiment, the pre-sealed containers are able to be opened (e.g., punctured, torn, etc.) by the distribution machine 102 via the opener element 212. The distribution machine 102 may rinse the pre-sealed containers with a liquid via the rinsing element 214 to ensure that all or most of the powder is out of the container. Alternatively, the distribution machine 102 may use air or an ultrasonic shaker to ensure that all or most of the powder is out of the container. In some embodiments, one or more of the powders used by the distribution machine 102 may be coated such that they flow more easily. In such embodiments, rinsing with liquid or air and/or shaking may be unnecessary to ensure that all or most of the powder is out of the container.

In an embodiment, the distribution machine 102 comprises a dispensing mechanism (e.g., the dispensing element 202) that is structured in such a way so as to minimize cross-contamination. For example, the dispensing element 202 of the distribution machine 102 may be rinsed between operations using the cleaning component 216 and/or sanitized between operations using the sanitization component 218. In some embodiments, to avoid cross-contamination, the ingredients are dispensed directly into the vessel being provided to the consumer. In such embodiments, in order to mix the ingredients in the vessel, a non-contact mixing method via the non-contact mixing element 220 is used so as to continue to avoid cross-contamination. For example, a straw that is provided with the vessel may be used to mix the ingredients in the vessel. In another example, an ultrasonic mixer is used to mix the ingredients in the vessel.

In order to instill trust in the consumer and to show them in some tangible way that they are getting what they asked/paid for, the distribution machine 102 may comprise visual queues (such as via the user interface 104) that are activated as ingredients are added to their customized beverage or beverage concentrate. Additionally or alternatively, the distribution machine 102 may show or provide the consumer with the empty ingredient container(s).

The distribution machine 102 may provide a customized beverage that is ready to drink via the dispensing element 202. In such a case, if the distribution machine 102 uses powders to produce the customized beverage, the powders may combined with a liquid to liquefy the powders and the liquefied powders may then be combined with the other liquid ingredients via the combining element 204 to produce the customized beverage. The distribution machine 102 may also provide a customized beverage concentrate in liquid or powder form via the dispensing element 202 that could be combined with a liquid at a later time to produce a drink. The distribution machine 102 may provide the customized beverage concentrate and the liquid to be combined with the customized beverages concentrate to the consumer via the dispensing element 202 and allow the consumer to combine the two when they want to consume the drink. For example, the distribution machine 102 may provide a liquid base with a powder pack attached via the dispensing element 202. Alternatively, the distribution machine 102 may provide just the beverage concentrate via the dispensing element 202 and the user may be responsible for the liquid to be combined with the customized beverage concentrate. In such an embodiment, the distribution machine 102 may convey to the consumer the proper ratio of liquid ingredients to be mixed with customized beverage concentrate (e.g., via the user interface 104 or an application on the consumer's mobile device 134).

In an embodiment, as discussed above, a consumer may use his or her mobile device 134 to input need information and want information via the user interface 136. For example, the mobile device 134 may comprise an application that solicits direct input from the consumer or more general input from the consumer by having the consumer answer questions. Such need and want information may be associated with the consumer and stored in a consumer profile in the consumer profile database 124. When the consumer visits the distribution machine 102, the personalization server 108 may receive the consumer's profile from the consumer profile database 124 based on the distribution machine 102 conveying a consumer identification received from the mobile device 134 to the personalization server 108 or the mobile device 134 conveying the consumer identification to the personalization server 108. In an alternative embodiment, the mobile device 134 stores the consumer's profile and sends the consumer's profile to the personalization server 108.

The personalization server 108 may work in conjunction with the analysis engine 110 to provide to the distribution machine 102 one or more customized beverage or beverage concentrate recipes based at least on the consumer's need and want information from the consumer's profile and an application of a plurality of rules from the rules database 126. The distribution machine 102 may produce and deliver via the generation element 106 and the dispensing element 202 a customized beverage or beverage concentrate based on the one or more customized beverage or beverage concentrate recipes. In some embodiments, the consumer may be provided with abstracts corresponding to the one or more customized beverage or beverage concentrate recipes and make a selection of one of the abstracts via the user interface 136 of the consumer's mobile device 134 or the user interface 104 of the distribution machine 102. In such embodiments, the distribution machine 102 produces and delivers via the generation element 106 and the dispensing element 202 a customized beverage or beverage concentrate corresponding to the selected abstract.

The mobile device 134, for example via the user interface 126 and/or the application on the mobile device 134, may be used by the consumer to input direct feedback about the delivered customized beverage or beverage concentrate. Further, the mobile device 134, for example via the application on the mobile device 134, may also be used to collect indirect feedback about the consumer (e.g., purchases, etc.). Such direct and/or indirect feedback may be provided by the mobile device 134 to one or more of the plurality of databases 120-126 for storage. In an embodiment, if the consumer likes his or her customized beverage or beverage concentrate, the mobile device 134 sends the customized beverage or beverage concentrate recipe to a friend's mobile device (e.g., via text, email, the application, etc.) so that the friend can try the customized beverage or beverage concentrate at the distribution machine 102 or another distribution machine.

Figure 3:
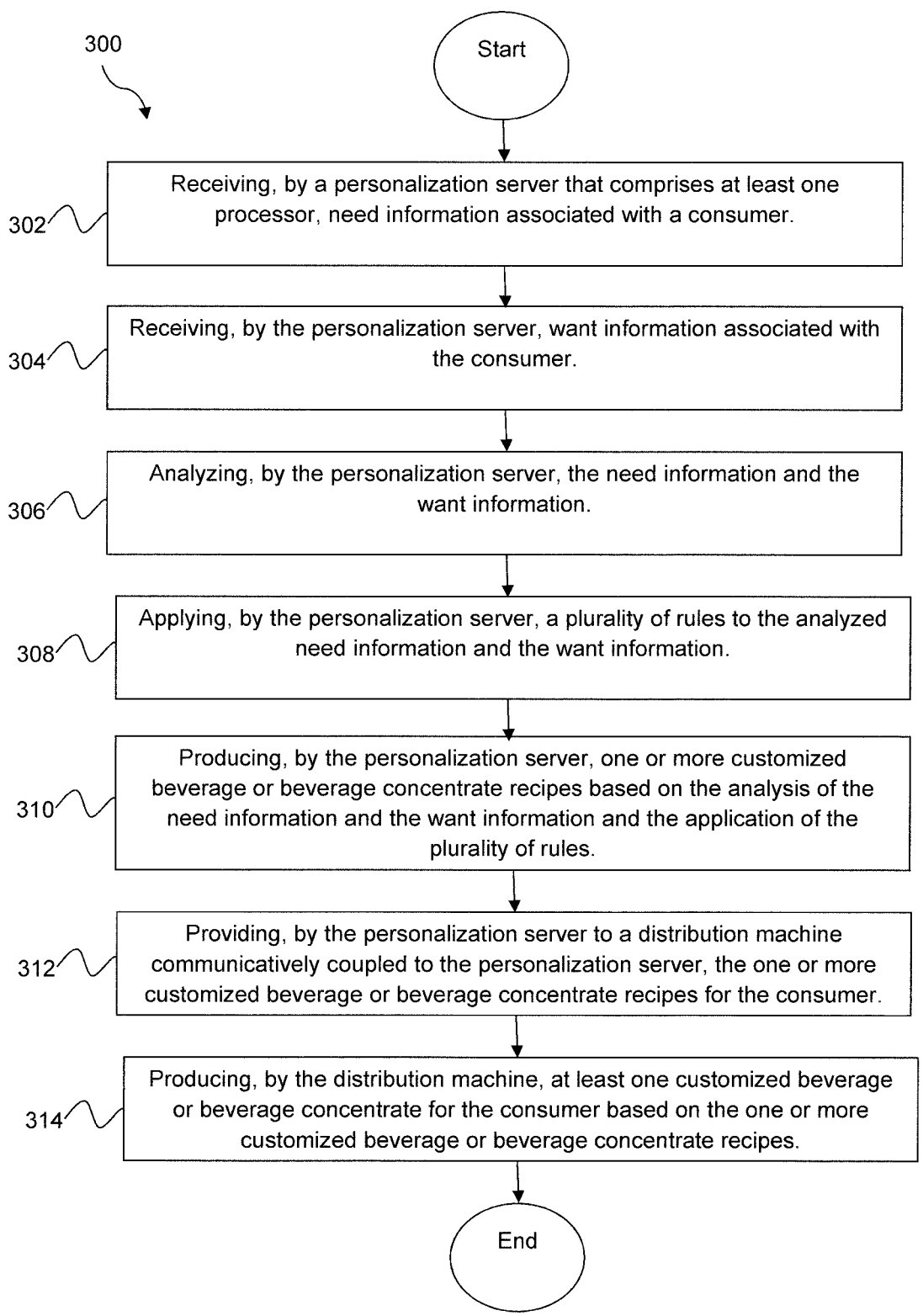
FIG. 3 is a flow chart of a method for producing a customized beverage or beverage concentrate according to an embodiment of the disclosure.

Now turning to FIG. 3, a method 300 for producing a customized beverage or beverage concentrate is described. At block 302, need information associated with a consumer is received by the personalization server 108. The need information may comprise information about what the consumer needs in a beverage to improve the consumer's health or diet and may include one or more of gender, age, ethnicity, nutritional status, health status, bone health, hydration level, vitamin or mineral measurement, temperature, time of day, mental status, lifestyle, DNA, microbiome, environment, allergies, vitamins, minerals, or probiotics. At block 304, want information associated with the consumer is received by the personalization server 108. The want information may comprise information about what the consumer desires or prefers in a beverage in terms of sense or experience and may include one or more of a flavor parameter, a texture parameter, a sweetness parameter, or a carbonation parameter.

At block 306, the need information and the want information is analyzed by the personalization server 108. At block 308, a plurality of rules is applied by the personalization server 108 to the analyzed need and want information. The plurality of rules may comprise a regulatory rule, a stability rule, and a taste rule from the rules database 126. At block 310, one or more customized beverage or beverage concentrate recipes are produced by the personalization server 108 based on the analysis of the need information and the want information and the application of the plurality of rules. At block 312, the one or more customized beverage or beverage concentrate recipes are provided by the personalization server 108 to the distribution machine 102. At block 314, at least one customized beverage or beverage concentrate is produced by the distribution machine 102 for the consumer based on the one or more customized beverage or beverage concentrate recipes.

Figure 4:
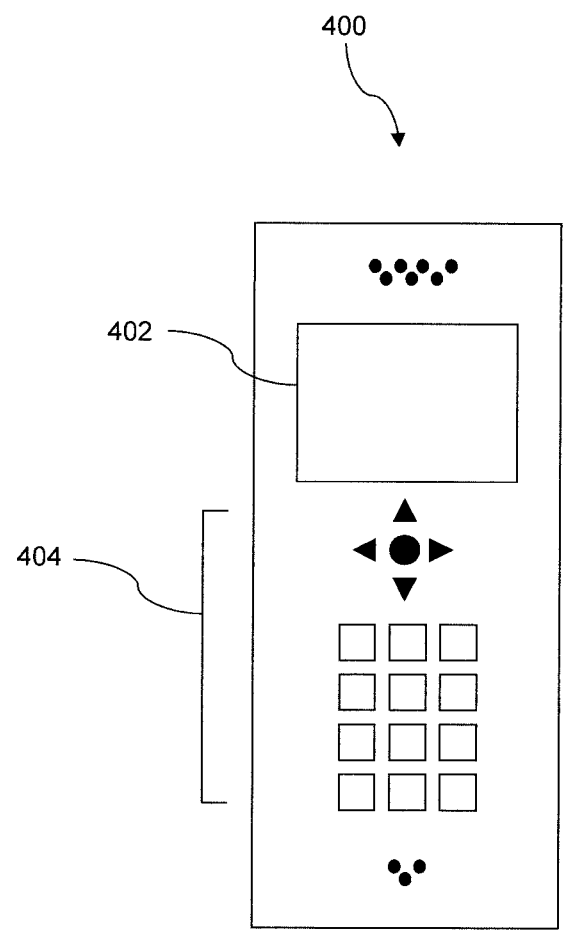
FIG. 4 depicts a mobile device which may be operable for implementing aspects of the present disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the mobile device 400, a user may be able to download and install additional applications on the mobile device 400, and an icon associated with such downloaded and installed applications may be added to the touch screen display 402 or to an alternative screen. The mobile device 400 may have other components such as electro-mechanical switches, speakers, camera lenses, microphones, input and/or output connectors, and other components as are well known in the art. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the touch screen display 402 to show a web page. The web page may be obtained via wireless communications with a base transceiver station, a wireless network access node, a peer mobile device 400 or any other wireless communication network or system.

Figure 5:
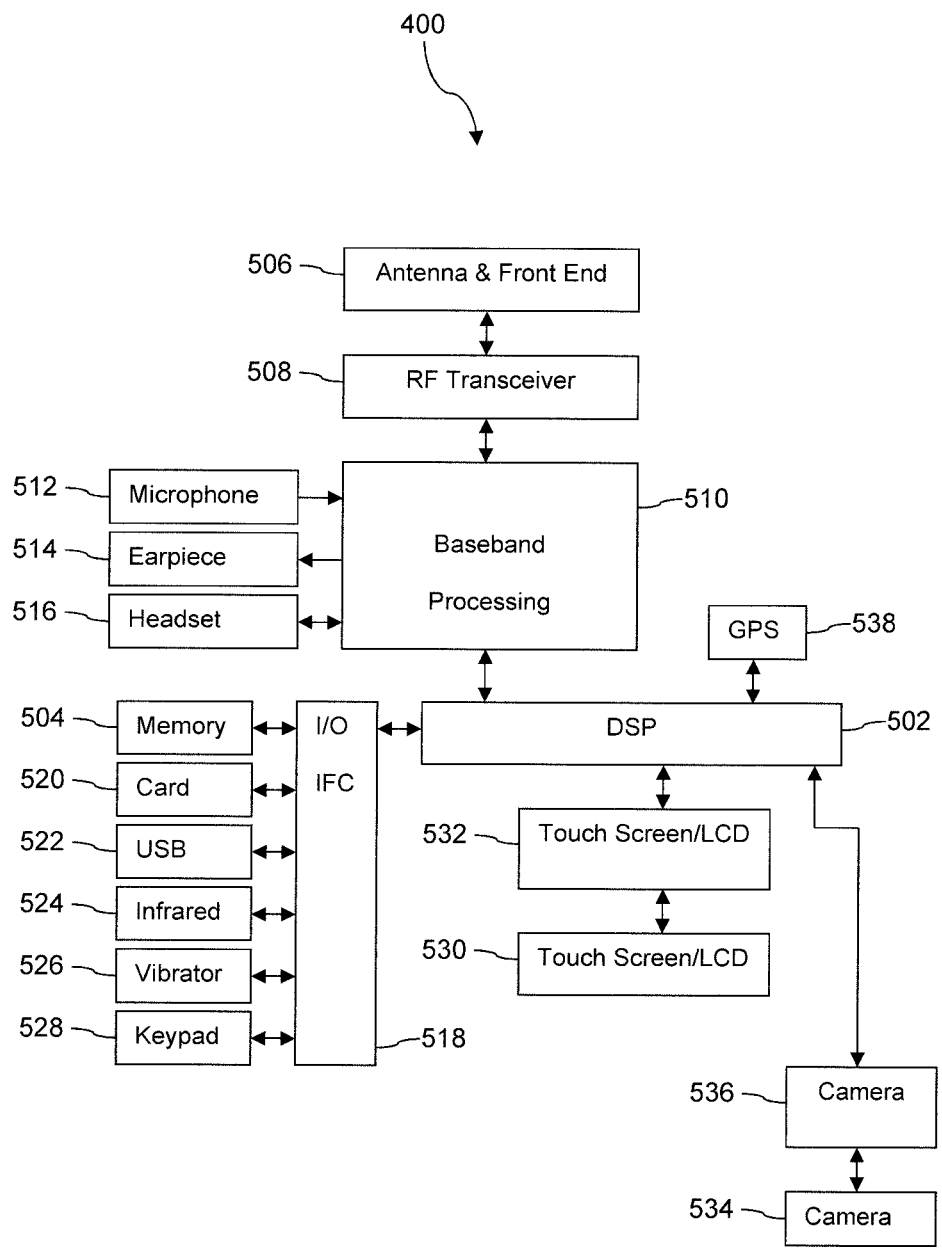
FIG. 5 shows a block diagram of a mobile device which may be operable for implementing aspects of the present disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the mobile device 400 may include both the touch screen display 530 and additional display component that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations. In an embodiment, the mobile device 400 may comprise a near field communication (NFC) transceiver. The NFC transceiver may be used to complete payment transactions with point-of-sale terminals or other communications exchanges. In an embodiment, the mobile device 400 may comprise a radio frequency identify (RFID) reader and/or writer device.

The switches 528 may couple to the DSP 502 via the input/output interface 518 to provide one mechanism for the user to provide input to the mobile device 400. Alternatively, one or more of the switches 528 may be coupled to a motherboard of the mobile device 400 and/or to components of the mobile device 400 via a different path (e.g., not via the input/output interface 518), for example coupled to a power control circuit (power button) of the mobile device 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the mobile device 400 to determine its position.

Figure 6A:
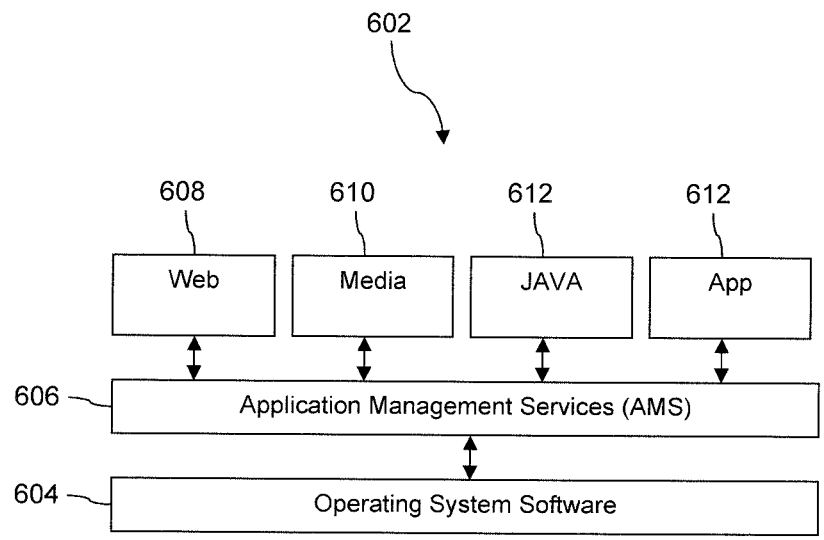
FIG. 6A illustrates a software environment that may be capable of implementing embodiments of the present disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and another application 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
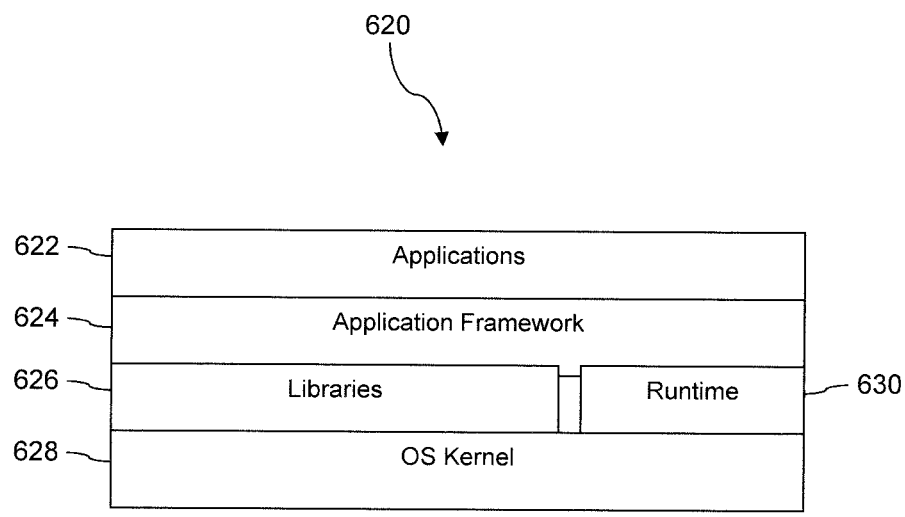
FIG. 6B illustrates an alternative software environment that may be capable of implementing embodiments of the present disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
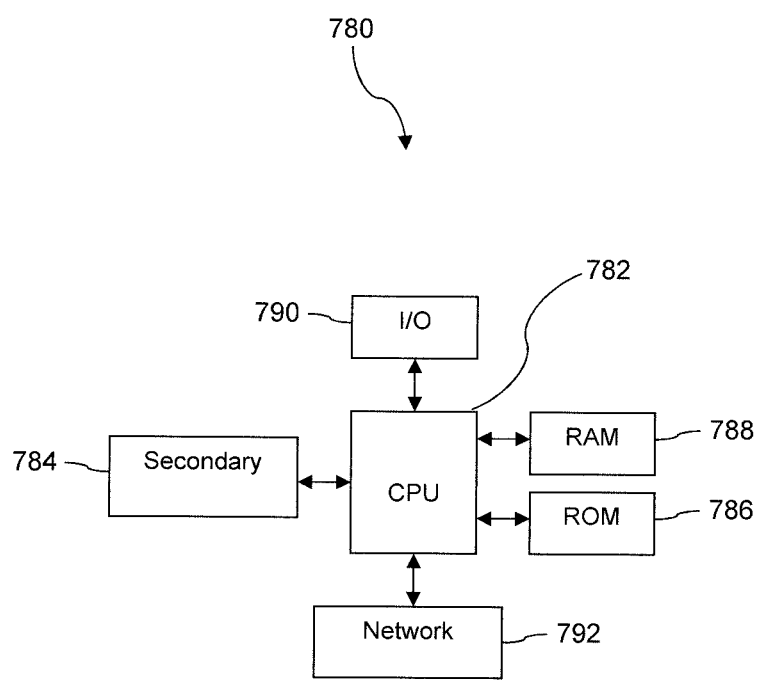
FIG. 7 illustrates an exemplary computer system that may be suitable for implementing the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 780 is turned on or booted, the CPU 782 may execute a computer program or application. For example, the CPU 782 may execute software or firmware stored in the ROM 786 or stored in the RAM 788. In some cases, on boot and/or when the application is initiated, the CPU 782 may copy the application or portions of the application from the secondary storage 784 to the RAM 788 or to memory space within the CPU 782 itself, and the CPU 782 may then execute instructions that the application is comprised of. In some cases, the CPU 782 may copy the application or portions of the application from memory accessed via the network connectivity devices 792 or via the I/O devices 790 to the RAM 788 or to memory space within the CPU 782, and the CPU 782 may then execute instructions that the application is comprised of. During execution, an application may load instructions into the CPU 782, for example load some of the instructions of the application into a cache of the CPU 782. In some contexts, an application that is executed may be said to configure the CPU 782 to do something, e.g., to configure the CPU 782 to perform the function or functions promoted by the subject application. When the CPU 782 is configured in this way by the application, the CPU 782 becomes a specific purpose computer or a specific purpose machine.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), flash drive, ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for producing a customized beverage or beverage concentrate, comprising:
    a personalization server that comprises at least one processor, the personalization server configured to:
        receive need information associated with a consumer, wherein the need information comprises information about what the consumer needs in a beverage to improve the consumer's health or diet,
        receive want information associated with the consumer, wherein the want information comprises information about what the consumer desires or prefers in a beverage in terms of sense or experience,
        store, in a profile of the consumer, a plurality of profile elements, wherein the plurality of profile elements correspond to the received need information and the received want information, and
        produce one or more customized beverage or beverage concentrate recipes based at least in part on application of a plurality of rules to the need information and the want information, wherein the plurality of rules comprises at least two of a regulatory rule, a stability rule, a safety rule, and a taste rule; and
    a distribution machine communicatively coupled to the personalization server that comprises at least one processor and a generation element, the distribution machine configured to:
        receive the one or more customized beverage or beverage concentrate recipes from the personalization server, and
        produce and deliver at least one customized beverage or beverage concentrate based on the one or more customized beverage or beverage concentrate recipes via the generation element to the consumer by combining one or more beverage ingredients.

2. The system of claim 1, wherein the one or move beverage ingredients comprise at least one powder and at least one liquid.

3. The system of claim 1, wherein the personalization server receives the need information and the want information from the consumer via at least one of a user interface of the distribution machine, a mobile device, or a computer.

4. The system of claim 1, wherein the distribution machine further comprises a user interface, and wherein the distribution machine is further configured to:
    display one or more abstracts corresponding to the one or more customized beverage or beverage concentrate recipes to the consumer via the user interface, and
    receive a selection of one of the one or more abstracts corresponding to one of the one or more customized beverage or beverage concentrate recipes from the consumer via the user interface, wherein the at least one customized beverage or beverage concentrate produced and delivered to the consumer is based on the selected abstract corresponding to the one of the one or more customized beverage or beverage concentrate recipes.

5. The system of claim 1, wherein subsequent to the delivery of the at least one customized beverage or beverage concentrate to the consumer, the personalization server is further configured to receive feedback from the consumer regarding the delivered at least one customized beverage or beverage concentrate, wherein the feedback comprises either a consumer indication or analysis of a purchase history of the at least one customized beverage or beverage concentrate.

6. The system of claim 1, wherein the distribution machine is further configured to receive identification of the consumer, wherein the personalization server is further configured to receive the profile based on the identification of the consumer, and wherein the profile is a personal profile associated with a consumer or a cluster profile associated with a category of consumer that includes the consumer and comprises the need information and the want information associated with the consumer.

7. The system of claim 1, wherein the sense or experience comprises one or more of taste, sight, smell, touch, or sound.

8. The system of claim 1, wherein the want information and the need information is at least one of gathered directly from the consumer or inferred by the personalization server based on information provided by the consumer.

9. A method for producing a customized beverage or beverage concentrate, comprising:
    receiving, by a personalization server that comprises at least one processor, need information associated with a consumer, wherein the need information comprises information about what the consumer needs in a beverage to improve the consumer's health or diet and includes one or more of gender, age, ethnicity, nutritional status, health status, bone health, hydration level, vitamin or mineral measurement, temperature, time of day, mental status, lifestyle, DNA, microbiome, environment, allergies, vitamins, minerals, or probiotics;
    receiving, by the personalization server, want information associated with the consumer, wherein the want information comprises information about what the consumer desires or prefers in a beverage in terms of sense or experience and includes one or more of a flavor parameter, a texture parameter, a sweetness parameter, or a carbonation parameter;
    storing, in a profile of the consumer, a plurality of profile elements, wherein the plurality of profile elements correspond to the received need information and the received want information;

producing, by the personalization server, one or more customized beverage or beverage concentrate recipes based at least in part on application of a plurality of rules to the need information and the want information, wherein the plurality of rules comprises a regulatory rule, a stability rule, a safety rule, and a taste rule;

providing, by the personalization server to a distribution machine communicatively coupled to the personalization server, the one or more customized beverage or beverage concentrate recipes for the consumer; and producing, by the distribution machine, at least one customized beverage or beverage concentrate for the consumer based on the one or more customized beverage or beverage concentrate recipes.

10. The method of claim 9, further comprising providing, by the personalization server to another distribution machine, at least one customized beverage or beverage concentrate recipe for another consumer based in part on feedback received by the personalization server from the consumer regarding at least one of the one or more customized beverage or beverage concentrate recipes provided for the consumer or the at least one customized beverage or beverage concentrate produced for the consumer.

11. A method for producing a customized beverage or beverage concentrate, comprising:
receiving, by a personalization server that comprises at least one processor, need information associated with a consumer, wherein the need information comprises information about what the consumer needs in a beverage to improve the consumer's health or diet;

receiving, by the personalization server, want information associated with the consumer, wherein the want information comprises information about what the consumer desires or prefers in a beverage in terms of sense or experience;

storing, in a profile of the consumer, a plurality of profile elements, wherein the plurality of profile elements correspond to the received need information and the received want information;

producing, by the personalization server, one or more customized beverage or beverage concentrate recipes based at least in part on application of a plurality of rules to the need information and the want information, wherein the plurality of rules comprises at least two of a regulatory rule, a stability rule, a safety rule, and a taste rule;

receiving, by a distribution machine communicatively coupled to the personalization server, the one or more customized beverage or beverage concentrate recipes from the personalization server; and producing and delivering, by the distribution machine, at least one customized beverage or beverage concentrate based on the one or more customized beverage or beverage concentrate recipes via the generation element to the consumer by combining one or more beverage ingredients.

12. The method of claim 11, wherein the one or move beverage ingredients comprise at least one powder and at least one liquid.

13. The method of claim 11, wherein the personalization server receives the need information and the want information from the consumer via at least one of a user interface of the distribution machine, a mobile device, or a computer.

14. The method of claim 11, wherein the distribution machine further comprises a user interface, the method further comprising:
displaying, by the distribution machine, one or more abstracts corresponding to the one or more customized beverage or beverage concentrate recipes to the consumer via the user interface; and receiving, by the distribution machine, a selection of one of the one or more abstracts corresponding to one of the one or more customized beverage or beverage concentrate recipes from the consumer via the user interface, wherein the at least one customized beverage or beverage concentrate produced and delivered to the consumer is based on the selected abstract corresponding to the one of the one or more customized beverage or beverage concentrate recipes.

15. The method of claim 11, wherein subsequent to the delivery of the at least one customized beverage or beverage concentrate to the consumer, the personalization server is further configured to receive feedback from the consumer regarding the delivered at least one customized beverage or beverage concentrate, wherein the feedback comprises either a consumer indication or analysis of a purchase history of the at least one customized beverage or beverage concentrate.

16. The method of claim 11, further comprising:
receiving, by the distribution machine, identification of the consumer; and
receiving, by the personalization server, the profile based on the identification of the consumer;
wherein the profile is a personal profile associated with a consumer or a cluster profile associated with a category of consumer that includes the consumer and comprises the need information and the want information associated with the consumer.

17. The method of claim 11, wherein the sense or experience comprises one or more of taste, sight, smell, touch, or sound.

18. The method of claim 11, wherein the want information and the need information is at least one of gathered directly from the consumer or inferred by the personalization server based on information provided by the consumer.

* * * * *